United States Patent
Inagaki et al.

(10) Patent No.: US 6,800,689 B2
(45) Date of Patent: Oct. 5, 2004

(54) PROCESS FOR PRODUCING POLYMER RUBBER AND OIL EXTENDED POLYMER RUBBER

(75) Inventors: Katsunari Inagaki, Ichihara (JP); Seiichi Mabe, Ichihara (JP)

(73) Assignee: Sumitomo Chemical Company, Limited, Osaka (JP)

(*) Notice: Subject to any disclaimer, the term of this patent is extended or adjusted under 35 U.S.C. 154(b) by 90 days.

(21) Appl. No.: 10/270,484

(22) Filed: Oct. 16, 2002

(65) Prior Publication Data

US 2003/0181599 A1 Sep. 25, 2003

(30) Foreign Application Priority Data

Mar. 20, 2002 (JP) ........................... 2002-078343

(51) Int. Cl.$^7$ ................................ C08L 9/00; C08L 25/02
(52) U.S. Cl. .................. 525/98; 525/236; 525/237; 525/241; 525/250; 525/314; 525/258
(58) Field of Search ..................... 525/98, 236, 237, 525/241, 250, 314, 258

(56) References Cited

U.S. PATENT DOCUMENTS

| 4,537,936 A | * | 8/1985 | Takao et al. ............... 525/236 |
| 5,731,129 A | * | 3/1998 | Koshimura et al. ...... 430/288.1 |
| 6,469,106 B2 | * | 10/2002 | Inagaki et al. ............. 525/342 |

FOREIGN PATENT DOCUMENTS

| JP | 58-120619 A | 7/1983 |
| JP | 60-72907 A | 4/1985 |

* cited by examiner

Primary Examiner—James J. Seidleck
Assistant Examiner—Olga Asinovsky
(74) Attorney, Agent, or Firm—Sughrue Mion, PLLC

(57) ABSTRACT

There is provided a process for producing polymer rubber, which comprises the step of polymerizing a conjugated diene monomer or a combination of a conjugated diene monomer with an aromatic vinyl monomer in the presence of (1) an organolithium compound, (2) a solvent, (3) tetrahydrofuran in an amount of 0.0106 to 0.1060% by weight, and (4) ethylene glycol diethyl ether in an amount of 0.02 to 0.30% by weight, wherein the polymer rubber satisfies the conditions of (a) a vinyl group content in the polymer rubber is not less than 60% by weight, and (b) a Q value (Mw/Mn) of the polymer rubber is not more than 1.35.

4 Claims, No Drawings

PROCESS FOR PRODUCING POLYMER RUBBER AND OIL EXTENDED POLYMER RUBBER

FIELD OF THE INVENTION

The present invention relates to a process for producing polymer rubber, and also relates to oil extended polymer rubber. More specifically, the present invention relates to a process for producing polymer rubber, and oil extended polymer rubber, which rubbers have a high vinyl group content, a narrow molecular weight distribution, and more preferably a high molecular weight, and which rubbers are suitable particularly for tire use.

BACKGROUND OF THE INVENTION

There is known a process for controlling a vinyl group content contained in butadiene copolymer rubber, which process comprises polymerizing butadiene in the presence of an ether such as tetrahydrofuran using an organolithium compound. However, the process has a problem that a large amount of tetrahydrofuran must be used in order to obtain rubber having a high vinyl group content.

JP-B 5-46365 discloses a process for controlling a vinyl group content by using two kinds of ethers. However, the process is not satisfactory from a viewpoint of obtaining efficiently butadiene copolymer rubber having a high vinyl group content. Moreover, according to the process, it is difficult to obtain butadiene copolymer rubber having a high vinyl group content, a high molecular weight, and a narrow molecular weight distribution, which rubber is suitable particularly for tire use.

SUMMARY OF THE INVENTION

An object of the present invention is to provide a process for producing polymer rubber, and oil extended polymer rubber, which rubbers have a high vinyl group content, a narrow molecular weight distribution, and more preferably a high molecular weight, and which rubbers are suitable particularly for tire use.

The present invention provides a process (the process being hereinafter referred to as "Process 1") for producing polymer rubber, which comprises the step of polymerizing a conjugated diene monomer or a combination of a conjugated diene monomer with an aromatic vinyl monomer in the presence of:

(1) an organolithium compound represented by the following formula (I), in which R' is an aliphatic or aromatic hydrocarbon group, which may contain a hetero atom, and X is an integer of 1 to 4,

$$R'(Li)_x \qquad (I)$$

(2) a solvent, (3) tetrahydrofuran in an amount of 0.0106 to 0.1060% by weight, provided that an amount of the solvent is 100% by weight, and (4) ethylene glycol diethyl ether in an amount of 0.02 to 0.30% by weight, provided that an amount of the solvent is 100% by weight, wherein the polymer rubber satisfies the conditions:

(a) a vinyl group content in the polymer rubber is not less than 60% by weight, provided that an amount of a conjugated diene monomer unit in the polymer rubber is 100% by weight, and (b) a Q value (Mw/Mn) of the polymer rubber is not more than 1.35.

Further, the present invention provides a process (the process being hereinafter referred to as "Process 2") for producing coupling-treated polymer rubber, which comprises the steps of:

(i) polymerizing a combination of a conjugated diene monomer with an aromatic vinyl monomer in the presence of:

(1) an organolithium compound represented by the above formula (I), (2) a solvent, (3) tetrahydrofuran in an amount of 0.0106 to 0.0742% by weight, provided that an amount of the solvent is 100% by weight, and (4) ethylene glycol diethyl ether in an amount of 0.02 to 0.20% by weight, provided that an amount of the solvent is 100% by weight, thereby obtaining polymer rubber satisfying the conditions:

(a) a vinyl group content in the polymer rubber is not less than 65% by weight, provided that an amount of a conjugated diene monomer unit in the polymer rubber is 100% by weight, and an aromatic vinyl monomer unit content in the polymer rubber is from 20 to 50% by weight, provided that an amount of the polymer rubber is 100% by weight, and (b) a Q value (Mw/Mn) of the polymer rubber is not more than 1.30, and (ii) reacting the above-obtained polymer rubber with a coupling agent, wherein the coupling-treated polymer rubber has a Q value (Mw/Mn) of not more than 2.2 and Mw of not less than 600,000.

Furthermore, the present invention provides an oil extended polymer rubber, which comprises a conjugated diene monomer unit and an aromatic vinyl monomer unit, and satisfies the conditions:

(a) a vinyl group content in the oil extended polymer rubber is not less than 65% by weight, provided that an amount of a conjugated diene monomer unit in the oil extended polymer rubber is 100% by weight, and an aromatic vinyl monomer unit content in the oil extended polymer rubber is from 25 to 40% by weight, provided that an amount of a polymer rubber contained in the oil extended polymer rubber is 100% by weight, (b) a Q value (Mw/Mn) of the polymer rubber contained in the oil extended polymer rubber is not more than 2.1, and Mw of the polymer rubber is not less than 1,100,000, and (c) an oil content in the oil extended polymer rubber is not less than 40 phr.

Still further, the present invention provides a process (the process being hereinafter referred to as "Process 3") for producing oil extended polymer rubber, which comprises the steps of:

(i) polymerizing a combination of a conjugated diene monomer with an aromatic vinyl monomer in the presence of:

(1) an organolithium compound represented by the above formula (I), (2) a solvent, (3) tetrahydrofuran in an amount of 0.0106 to 0.0742% by weight, provided that an amount of the solvent is 100% by weight, and (4) ethylene glycol diethyl ether in an amount of 0.02 to 0.20% by weight, provided that an amount of the solvent is 100% by weight, thereby obtaining polymer rubber satisfying the conditions:

(a) a vinyl group content in the polymer rubber is not less than 65% by weight, provided that an amount of a conjugated diene monomer unit in the polymer rubber is 100% by weight, and an aromatic vinyl monomer unit content in the polymer rubber is from 25 to 40% by weight, provided that an amount of the polymer rubber is 100% by weight, and (b) a Q value (Mw/Mn) of the polymer rubber is not more than 1.30, (ii) reacting the above-obtained polymer rubber with a coupling agent to obtain a coupling-treated polymer rubber having a Q value (Mw/Mn) of not more than 2.1 and Mw of not less than 1,100,000, and (iii) mixing the above-obtained coupling-treated polymer rubber with an oil, wherein the oil extended polymer rubber has an oil content of not less than 30 phr based on 100 parts by weight of the coupling-treated polymer rubber.

In the above, a monomer unit such as "conjugated diene monomer unit" and "aromatic vinyl monomer unit" means a polymerized monomer unit.

DETAILED EXPLANATION OF THE INVENTION

The conjugated diene monomer used in the present invention is not particularly limited in its kind. Examples of the conjugated diene monomer are 1,3-butadiene, isoprene, 1,3-pentadiene (piperylene), 2,3-dimethyl-1,3-butadiene and 1,3-hexadiene. Among them, 1,3-butadiene or isoprene is particularly preferable from a viewpoint of physical properties of the polymer rubber obtained and industrial availability.

From a viewpoint of obtaining polymer rubber having a high glass transition temperature (Tg), a vinyl group content in the polymer rubber obtained according to Process 1 of the present invention is not less than 60% by weight, preferably not less than 65% by weight, and more preferably not less than 70% by weight, provided that an amount of the conjugated diene monomer unit in the polymer rubber is 100% by weight.

From the same viewpoint as above, respective vinyl group contents in the polymer rubber obtained in each step (i) of Processes 2 and 3 of the present invention, and a vinyl group content in the oil extended polymer rubber in accordance with the present invention are not less than 65% by weight, and preferably not less than 70% by weight, provided that an amount of the conjugated diene monomer unit in the polymer rubber is 100% by weight. Incidentally, the polymer rubber having a high Tg is suitably used for a tire having a superior gripping performance. When the above-mentioned content is less than 60% by weight in Process 1, and less than 65% by weight in Processes 2 and 3 and in the oil extended polymer rubber, Tg of the polymer rubber obtained and that of the oil extended polymer rubber are too low, and as a result, the resulting rubber may be unsuitable for tire use.

The aromatic vinyl monomer in the present invention means a compound having at least one vinyl group bound to a carbon atom of an aromatic nucleus. Examples of said compound are styrene, 1-vinylnaphthalene, 3-vinyltoluene, divinylbenzene, 3,5-diethylstyrene, 4-n-propylstyrene, 2,4,6-trimethylstyrene, 4-phenylstyrene, 4-p-tolylstyrene, 3,5-diphenylstyrene, 3-ethyl-1-vinylnaphthalene and 8-phenyl-1-vinylnaphthalene. Of these, styrene is preferable.

An aromatic vinyl monomer unit content in the polymer rubber obtained according to Process 1 of the present invention is not limited. The content is preferably from 20 to 50% by weight, and more preferably from 25 to 40% by weight, provided that an amount of the polymer rubber is 100% by weight.

An aromatic vinyl monomer unit content in the polymer rubber obtained in the step (i) of Process 2 of the present invention is from 20 to 50% by weight, and preferably from 25 to 40% by weight, provided that an amount of the polymer rubber is 100% by weight.

An aromatic vinyl monomer unit content in the polymer rubber obtained in the step (i) of Process 3 of the present invention is from 25 to 40% by weight, provided that an amount of the polymer rubber is 100% by weight.

An aromatic vinyl monomer unit content in the oil extended polymer rubber in accordance with the present invention is from 25 to 40% by weight, provided that an amount the polymer rubber contained in the oil extended polymer rubber is 100% by weight.

When the above-mentioned content is less than 20% by weight in Processes 1 and 2, and less than 25% by weight in Process 3 and in the oil extended polymer rubber, Tg of the polymer rubber obtained and that of the oil extended polymer rubber are too low, and as a result, the resulting rubber may be unsuitable for tire use.

When the above-mentioned content exceeds 50% by weight in Processes 1 and 2, and exceeds 40% by weight in Process 3, (i) solubility of the obtained polymer rubber to the solvent may decrease, (ii) a large amount of ethylene glycol diethyl ether may be required, or (iii) the polymer rubber having a narrow molecular weight distribution may not be obtained.

A carbon atom number of R' in the above formula (I) is not particularly limited. A compound represented by the formula (I), wherein X is 1 and R' is a hydrocarbon group having 1 to 20 carbon atoms, is preferable. A suitable R' is an alkyl group, an alkenyl group, a cycloalkyl group, an aryl group, an alkaryl group or an aralkyl group. Examples of R' are a methyl group, an ethyl group, a n-propyl group, an isopropyl group, a n-butyl group, an isobutyl group, a sec-butyl group, a tert-butyl group, a n-amyl group, an isoamyl group, a n-hexyl group, a 2-ethylhexyl group, a n-octyl group, a n-decyl group, a stearyl group, an allyl group, a n-propenyl group, an isobutenyl group, a 1-cyclohexenyl group, a cyclohexyl group, a cyclohexylethyl group, a phenyl group, a naphthyl group, a tolyl group, a butylphenyl group, an ethylnaphthyl group, a benzyl group and a phenylbutyl group.

Examples of a compound having 2 to 4 and a hydrocarbon group having 2 to 40 carbon atoms as X and R', respectively, in the formula (I) are tetramethylenedilithium, pentamethylenedilithium, hexamethylenedilithium, diphenylethylenedilithium, 1,5-dilithiumnaphthalene, 1,20-dilithioeicosane and 1,4-dilithiocyclohexane. R' may contain any hetero atom, as far as the polymerization is not adversely affected.

A preferred lithium compound is an organolithium compound, which is a low or high molecular weight linear polymer having lithium at one side terminal or both side terminals thereof. Among them, particularly preferable is polystyrylmonolithium, polybutadienylmonolithium, polyisoprenylmonolithium, polystyryldilithium, polybutadienyldilithium, polyisoprenyldilithium or a styrene-butadiene linear copolymer having lithium at one side terminal or both side terminals thereof.

It is permitted to use a combination of two or more lithium compounds mentioned above. Among the above-mentioned lithium compounds, an alkyllithium having an alkyl group of 2 to 8 carbon atoms is preferable, and n-butyllithium is particularly preferable.

An amount of the organolithium compound used is usually from 0.05 to 100 mmol per 1 mol of the monomer. When polymer rubber having a high molecular weight is to be obtained, an amount of said compound used is 0.1 to 10 mmol per 1 mol of the monomer. When the amount used exceeds 100 mmol, polymer rubber having a high molecular weight cannot be obtained. When the amount used is less than 0.05 mmol, polymer rubber having a ultrahigh molecular weight is obtained, and as a result, its properties such as kneading processability may deteriorate.

As the solvent used in the process in accordance with the present invention, an aliphatic hydrocarbon and an aromatic hydrocarbon are exemplified. Specific examples thereof are propane, butane, pentane, hexane, heptane, isooctane, cyclopentane, cyclohexane, decane, hexadecane, benzene, toluene, ethylbenzene, xylenes, naphthalene and tetrahydronaphthalene, and a combination of two or more thereof.

An amount of the solvent used is usually from 100 to 2000 parts by weight, and preferably from 300 to 1000 parts by weight, per 100 parts by weight of the monomer. When the amount used is less than 100 parts by weight, viscosity of the polymerization reaction mixture increases, and as a result, homogeneous polymer rubber having a narrow molecular weight distribution may not be obtained. When the amount used exceeds 2000 parts by weight, a large quantity of energy is required for (i) separation of the produced polymer rubber from the solvent, and (ii) purification of the solvent, the purified solvent being generally purified for recycling use. In order to keep viscosity of the solution during polymerization reaction to a suitable degree, it is permitted to add further solvent during polymerization reaction.

In the present invention, tetrahydrofuran and ethylene glycol diethyl ether are used to control the vinyl group content in the polymer rubber obtained. It is known that ethylene glycol dibutyl ether or N,N,N',N'-tetramethylethylenediamine is used to control the vinyl group content. However, when these compounds are used, it is difficult to obtain polymer rubber having a high molecular weight and a narrow molecular weight distribution as well as a high vinyl group content.

Provided that an amount of the solvent is 100% by weight, an amount of tetrahydrofuran used in Process 1 is from 0.0106 to 0.1060% by weight, preferably from 0.0106 to 0.0742% by weight, and more preferably from 0.0212 to 0.0640% by weight; and an amount thereof in Processes 2 and 3 is from 0.0106 to 0.0742% by weight, and more preferably from 0.0212 to 0.0640% by weight.

When the above amount used is less than 0.0106% by weight, (i) a polymerization reaction rate may decrease, and (ii) random property of the polymer rubber obtained may deteriorate. When the amount used exceeds 0.1060% by weight in Process 1, and exceeds 0.0742% by weight in Processes 2 and 3, a large amount of ethylene glycol diethyl ether is required to obtain polymer rubber having a high vinyl group content, and as a result, it may be substantially difficult to obtain polymer rubber having a high vinyl group content.

An amount of ethylene glycol diethyl ether used is from 0.02 to 0.30% by weight, and preferably from 0.02 to 0.20% by weight in Process 1; and from 0.02 to 0.20% by weight in Processes 2 and 3, provided that an amount of the solvent is 100% by weight.

When the above amount used is less than 0.02% by weight, polymer rubber having a high vinyl group content may not be obtained. When the amount used exceeds 0.30% by weight in Process 1, and exceeds 0.20% by weight in Processes 2 and 3, polymer rubber having a narrow molecular weight distribution may not be obtained.

As a polymerization method in the process in accordance with the present invention, it is recommendable to carry out a solution polymerization method. The polymerization can be carried out, for example, in a batch manner or in a continuous manner. An addition order of respective components used for the polymerization to a polymerization reactor is not particularly limited. All components may be added at the same time, or only tetrahyfrofuran and ethylene glycol diethyl ether may be added later.

A residence time in the continuous polymerization is generally from several ten minutes to about 2 hours. A polymerization time in the batch polymerization is not particularly limited, and all monomers are substantially consumed within 24 hours.

A polymerization temperature is usually from −80 to 150° C., and preferably from 0 to 80° C. In the batch polymerization, it is permitted to raise a temperature continuously or step by step. In the continuous polymerization, it is permitted to raise a temperature at the last stage of the polymerization reaction. A polymerization pressure is not limited, and usually a pressure under which the monomer can be substantially held at a liquid state is desirable.

The step (ii) in Processes 2 and 3 in accordance with the present invention is provided to improve properties of the rubber obtained such as rolling processability. Such a step can be carried out by adding a coupling agent such as silicon tetrachloride and tin tetrachloride to the reaction mixture obtained in the step (i).

When the oil extended polymer rubber in accordance with the present invention is used particularly for a tire, a Q value (Mw/Mn) of the polymer rubber contained in the oil extended polymer rubber is not more than 2.1, preferably not more than 1.35, more preferably not more than 1.30, and much more preferably not more than 1.25. When the oil extended polymer rubber is produced according to Process 3, a Q value (Mw/Mn) of the polymer rubber obtained in the step (i) of Process 3 is not more than 1.3, and more preferably not more than 1.25. In the above, Mw means a weight average molecular weight, and Mn means a number average molecular weight When the rubber obtained according to any Process in accordance with the present invention is used particularly for a tire, a Q value (Mw/Mn) of the polymer rubber obtained according to Process 1 is not more than 1.35, preferably not more than 1.30, and more preferably not more than 1.25; a Q value (Mw/Mn) of the polymer rubber obtained in the step (i) of Processes 2 and 3 is not more than 1.30, and more preferably not more than 1.25; a Q value (Mw/Mn) of the polymer rubber obtained in the step (ii) of Process 2 is not more than 2.2, and preferably not more than 2.1; and a Q value (Mw/Mn) of the polymer rubber obtained in the step (ii) of Process 3 is not more than 2.1.

From a viewpoint that the rubber has high modulus, superior abrasion resistance and superior kneading processability, a weight average molecular weight (Mw) of the oil extended polymer rubber in accordance with the present invention is not less than 1,100,000. From the same viewpoint as above, a weight average molecular weight (Mw) of the polymer rubber obtained according to Process 1 is preferably not less than 200,000, more preferably not less than 500,000, and much more preferably not less than 700,000; a weight average molecular weight (Mw) of the polymer rubber obtained in the step (ii) of Process 2 is not less than 600,000, preferably not less than 1,100,000, and more preferably not less than 1,200,000; and a weight average molecular weight (Mw) of the polymer rubber obtained in the step (ii) of Process 3 is not less than 1,100,000, and more preferably not less than 1,200,000.

The step (iii) of Process 3 is provided to improve kneading processability of the polymer rubber obtained in the step (ii), which polymer rubber has a high weight average molecular weight, such as, for example, 1,300,000 or more, or 1,700,000 or more. The step (iii) can be carried out by kneading the reaction mixture obtained in the step (ii) with oil. As the oil, an aromatic oil generally used in a rubber field is exemplified. An amount of the oil used is preferably not less than 30 phr, more preferably not less than 40 phr, and much more preferably 50 phr, per 100 parts by weight of the polymer rubber contained in the reaction mixture.

It is recommended that respective components used in the polymerization reaction contain substantially no polymerization-inhibiting substance such as water, oxygen and carbon dioxide. For this reason, it is preferable to carry out the polymerization in an atmosphere of a dried inert gas such as nitrogen and argon.

As a method for post-treating the obtained polymerization reaction mixture or coupling reaction mixture, the following methods 1 to 4 are exemplified.

Method 1 comprising the steps of:
(1) adding an antioxidant such as phenyl-β-naphthylamine to the reaction mixture,
(2) further adding a deactivator such as methyl alcohol, isopropyl alcohol and water thereto to deactivate the organolithium compound, and
(3) recovering the polymer rubber.

Method 2 comprising the steps of:
(1) adding an antioxidant to the reaction mixture, and
(2) introducing the resulting mixture into a heated non-hydrocarbon diluent such as hot water to isolate the polymer rubber; or distilling out the solvent (for example, n-hexane) and unreacted monomer(s) from the resulting mixture to isolate the polymer rubber.

Method 3 comprising the steps of:
(1) adding an antioxidant to the reaction mixture,
(2) further adding, if necessary, a small amount of a compound deactivating the organolithium compound, and
(3) heating (if necessary, under reduced pressure) the resulting mixture to remove the solvent, thereby obtaining the dried polymer rubber at the same time.

Method 4 comprising the steps of:
(1) adding a deactivator such as methyl alcohol, isopropyl alcohol and water to deactivate the organolithium compound,
(2) further adding an antioxidant such as phenyl-β-naphthylamine to the reaction mixture, and
(3) recovering the polymer rubber.

Since the amount of the organolithium compound used is small in the present invention, any residue contained in the obtained polymer rubber, which residue is derived from the organolithium compound, do not usually give any problem to use of the rubber. The polymer rubber may be further washed with a large amount of a medium to reduce the residue contained therein. The residue may also be removed by a reprecipitation method known as a purification method of a polymer.

The vinyl group content in the polymer rubber obtained can be increased by means of lowering a polymerization temperature in addition to the use of tetrahydrofuran and ethylene glycol diethyl ether as mentioned above. In the present invention, it is possible to obtain the polymer rubber having a vinyl group content of not less than 75% by weight.

In the present invention, a high molecular weight polymer rubber containing substantially no gel can be obtained by appropriately determining a proportion of the monomer(s) and the organolithium compound to be used.

EXAMPLE

The present invention is explained with reference to Examples, but the present invention is not limited thereto.

Example 1

A 5 liter-inner volume stainless steel polymerization reaction vessel was washed and dried, and thereafter purged with dry nitrogen. Successively, 207 g of 1,3-butadiene, 93 g of styrene, 1.35 g of tetrahydrofuran, 2.55 kg of hexane and 5.1 g of ethylene glycol diethyl ether were introduced therein, and inner temperature was raised to 30° C.

To the mixture, a n-hexane solution of n-butyllithium was added in an amount of 2.5 mmol in terms of n-butyllithium, and 138 g of 1,3-butadiene and 62 g of styrene were continuously added thereto under stirring over 120 minutes and 90 minutes, respectively. Polymerization was carried out at 60° for 3 hours.

After completion of the polymerization, 0.375 mmol of silicon tetrachloride (a coupling agent) was added to the reaction mixture, stirring was continued for 30 minutes, 10 ml of methanol was added, and stirring was further continued for 5 minutes.

The obtained reaction mixture was taken out and mixed with 2.5 g of 2,6-di-t-butyl-p-cresol (an antioxidant, a trade name of SUMILIZER BHT, manufactured by Sumitomo Chemical Co., Ltd.). Thereafter, most of hexane was evaporated, and successively the remainder was dried under reduced pressure at 55° C. for 12 hours, thereby obtaining polymer rubber.

Example 2

Example 1 was repeated to obtain polymer rubber, except that a feeding amount of ethylene glycol diethyl ether was changed to 2.55 g.

Example 3

Example 1 was repeated to obtain polymer rubber, except that:
(1) the polymerization reaction vessel was changed to a 20 liter-inner volume stainless steel polymerization reaction vessel;
(2) a feeding amount of 1,3-butadiene was changed to 621 g;
(3) a feeding amount of styrene was changed to 279 g;
(4) a feeding amount of tetrahydrofuran was changed to 5.4 g;
(5) a feeding amount of hexane was changed to 10.2 kg;
(6) a feeding amount of ethylene glycol diethyl ether was changed to 20.4 g;

(7) an added amount of the n-hexane solution of n-butyllithium was changed to 3.0 mmol in terms of n-butyllithium;
(8) 414 g of 1,3-butadiene was added over 135 minutes;
(9) 186 g of styrene was added over 105 minutes;
(10) an added amount of silicon tetrachloride was changed to 1.8 mmol;
(11) an added amount of 2,6-di-t-butyl-p-cresol was changed to 7.5 g; and
(12) 900 g of an aromatic oil, a trade name of Fukkol Aromax-3, manufactured by Fuji kosan Co., Ltd., was added to the obtained reaction mixture.

Example 4

Example 3 was repeated to obtain polymer rubber, except that (1) a feeding amount of ethylene glycol diethyl ether was changed to 19.38 g; (2) an added amount of the n-hexane solution of n-butyllithium was changed to 2.9 mmol in terms of n-butyllithium; and (3) an added amount of silicon tetrachloride was changed to 1.74 mmol.

Example 5

Example 3 was repeated to obtain polymer rubber, except that (1) a feeding amount of 1,3-butadiene was changed to 585 g; (2) a feeding amount of styrene was changed to 315 g; (3) a feeding amount of ethylene glycol diethyl ether was changed to 18.36 g; (4) an added amount of the n-hexane solution of n-butyllithium was changed to 2.6 mmol in terms of n-butyllithium; (5) 390 g of 1,3-butadiene was added over 135 minutes; (6) 1210 g of styrene was added over 105 minutes; and (7) an added amount of silicon tetrachloride was changed to 1.56 mmol.

Comparative Example 1

Example 1 was repeated to obtain polymer rubber, except that 5.1 g of ethylene glycol diethyl ether was changed to 2.55 g of diethylene glycol diethyl ether.

Comparative Example 2

Example 1 was repeated to obtain polymer rubber, except that ethylene glycol diethyl ether was changed to N,N,N',N'-tetramethylethylenediamine.

Physical properties of the polymer rubber obtained in the above-mentioned Examples and Comparative Examples were measured according to the following methods, and the results are shown in Table 1, wherein THF is tetrahydrofuran, EGDE is ethylene glycol diethyl ether, DEGDE is diethylene glycol diethyl ether, and TMEDA is N,N,N',N'-tetramethylethylenediamine.

1. Vinyl group content in polymer rubber

It was measured according to infrared spectroscopic analysis.

2. Styrene unit content in polymer rubber

It was measured according to refractive index method.

3. Weight average molecular weight and molecular weight distribution of polymer rubber Using a solution obtained by dissolving 0.1 g of the polymer rubber in 20 ml of tetrahydrofuran, it was measured at 40° C. by means of a molecular weight measurement apparatus, a trade name of HLC-8120GPC, manufactured by Tosoh Corporation (comprising (i) a column composed of two columns, a trade name of TSK gel Super HM-H, manufactured by Tosoh Corporation, which columns are connected in series, and (ii) a ultraviolet spectrometer, a trade name of UV-8020). The molecular weight given in Table 1 is that converted to the molecular weight of standard polystyrene.

The above-mentioned Examples and Comparative Examples show the following.

1. In Examples 1 to 5, in which ethylene glycol diethyl ether was used, there were obtained polymer rubber having a high vinyl group content, a high molecular weight and a narrow molecular weight distribution.

2. In Comparative Example 1, in which diethylene glycol diethyl ether was used, there was obtained polymer rubber having a wide molecular weight distribution in spite of a high vinyl group content.

3. In Comparative Example 2, in which N,N,N',N'-tetramethylethylenediamine was used, there was obtained polymer rubber having a low vinyl group content.

4. In Examples 3, 4 and 5, there were obtained oil extended polymer rubber, each of which had a high molecular weight after the coupling reaction.

TABLE 1

|  |  | Example | | | | | Comparative Example | |
|---|---|---|---|---|---|---|---|---|
|  |  | 1 | 2 | 3 | 4 | 5 | 1 | 2 |
| Amount used |  |  |  |  |  |  |  |  |
| THF (wt %) |  | 0.0529 | 0.0529 | 0.0529 | 0.0529 | 0.0529 | 0.0529 | 0.0529 |
| EGDE (wt %) |  | 0.20 | 0.10 | 0.20 | 0.19 | 0.18 | — | — |
| DEGDE (wt %) |  | — | — | — | — | — | 0.10 | — |
| TMEDA (wt %) |  | — | — | — | — | — | — | 0.20 |
| Oil (phr) |  | 0 | 0 | 60 | 60 | 60 | 0 | 0 |
| Polymer rubber |  |  |  |  |  |  |  |  |
| Styrene unit content (wt %) |  | 31 | 30 | 30 | 30 | 34 | 30 | 31 |
| Vinyl group content (wt %) |  | 73 | 68 | 74 | 74 | 70 | 70 | 59 |
| Mw (×10³) | Before coupling reaction | 250 | 300 | 730 | 910 | 800 | 320 | 250 |
|  | After coupling reaction | 630 | 820 | 1380 | 1720 | 1650 | 400 | 650 |
| Q value (Mw/Mn) | Before coupling reaction | 1.10 | 1.07 | 1.16 | 1.24 | 1.22 | 1.36 | 1.13 |
|  | After coupling reaction | 1.69 | 1.63 | 1.73 | 1.77 | 1.96 | 1.66 | 1.79 |

What is claimed is:

1. A process for producing polymer rubber, which comprises the step of polymerizing a conjugated diene monomer or a combination of a conjugated diene monomer with an aromatic vinyl monomer in the presence of:

(1) an organolithium compound represented by the following formula (I), in which R' is an aliphatic or aromatic hydrocarbon group, which may contain a hetero atom, and X is an integer of 1 to 4,

R'(Li)$_x$                   (I)

(2) a solvent, (3) tetrahydrofuran in an amount of 0.0106 to 0.1060% by weight, provided that an amount of the solvent is 100% by weight, and (4) ethylene glycol diethyl ether in an amount of 0.02 to 0.30% by weight, provided that an amount of the solvent is 100% by weight, wherein the polymer rubber satisfies the conditions:

(a) a vinyl group content in the polymer rubber is not less than 60% by weight, provided that an amount of a conjugated diene monomer unit in the polymer rubber is 100% by weight, and (b) a Q value (Mw/Mn) of the polymer rubber is not more than 1.35.

2. A process for producing coupling-treated polymer rubber, which comprises the steps of:

(i) polymerizing a combination of a conjugated diene monomer with an aromatic vinyl monomer in the presence of:

(1) an organolithium compound represented by the following formula (I), in which R' is an aliphatic or aromatic hydrocarbon group, which may contain a hetero atom, and X is an integer of 1 to 4, R'(Li)$_x$                     (I)

(2) a solvent, (3) tetrahydrofuran in an amount of 0.0106 to 0.0742% by weight, provided that an amount of the solvent is 100% by weight, and (4) ethylene glycol diethyl ether in an amount of 0.02 to 0.20% by weight, provided that an amount of the solvent is 100% by weight, thereby obtaining polymer rubber satisfying the conditions:

(a) a vinyl group content in the polymer rubber is not less than 65% by weight, provided that an amount of a conjugated diene monomer unit in the polymer rubber is 100% by weight, and an aromatic vinyl monomer unit content in the polymer rubber is from 20 to 50% by weight, provided that an amount of the polymer rubber is 100% by weight, and (b) a Q value (Mw/Mn) of the polymer rubber is not more than 1.30, and (ii) reacting the above-obtained polymer rubber with a coupling agent, wherein the coupling-treated polymer rubber has a Q value (Mw/Mn) of not more than 2.2 and Mw of not less than 600,000.

3. An oil extended polymer rubber, which comprises a conjugated diene monomer unit and an aromatic vinyl monomer unit, and satisfies the conditions:

(a) a vinyl group content in the oil extended polymer rubber is not less than 65% by weight, provided that an amount of a conjugated diene monomer unit in the oil extended polymer rubber is 100% by weight, and an aromatic vinyl monomer unit content in the oil extended polymer rubber is from 25 to 40% by weight, provided that an amount of a polymer rubber contained in the oil extended polymer rubber is 100% by weight, (b) a Q value (Mw/Mn) of the polymer rubber contained in the oil extended polymer rubber is not more than 2.1, and Mw of the polymer rubber is not less than 1,100,000, and (c) an oil content in the oil extended polymer rubber is not less than 40 phr.

4. A process for producing oil extended polymer rubber, which comprises the steps of:

(i) polymerizing a combination of a conjugated diene monomer with an aromatic vinyl monomer in the presence of:

(1) an organolithium compound represented by the following formula (I), in which R' is an aliphatic or aromatic hydrocarbon group, which may contain a hetero atom, and X is an integer of 1 to 4,

R'(Li)$_x$                     (I)

(2) a solvent, (3) tetrahydrofuran in an amount of 0.0106 to 0.0742% by weight, provided that an amount of the solvent is 100% by weight, and (4) ethylene glycol diethyl ether in an amount of 0.02 to 0.20% by weight, provided that an amount of the solvent is 100% by weight, thereby obtaining polymer rubber satisfying the conditions:

(a) a vinyl group content in the polymer rubber is not less than 65% by weight, provided that an amount of a conjugated diene monomer unit in the polymer rubber is 100% by weight, and an aromatic vinyl monomer unit content in the polymer rubber is from 25 to 40% by weight, provided that an amount of the polymer rubber is 100% by weight, and (b) a Q value (Mw/Mn) of the polymer rubber is not more than 1.30, (ii) reacting the above-obtained polymer rubber with a coupling agent to obtain a coupling-treated polymer rubber having a Q value (Mw/Mn) of not more than 2.1 and Mw of not less than 1,100,000, and (iii) mixing the above-obtained coupling-treated polymer rubber with an oil, wherein the oil extended polymer rubber has an oil content of not less than 30 phr based on 100 parts by weight of the coupling-treated polymer rubber.

* * * * *